(12) United States Patent
Akkashian

(10) Patent No.: US 6,500,005 B2
(45) Date of Patent: Dec. 31, 2002

(54) ROTATING EARTH GLOBE HAVING MUSIC BOX SPRING MOTOR THAT PLAYS MUSIC AND ROTATES GLOBE

(76) Inventor: Eric Walter Akkashian, 4793 Motorway, Waterford, MI (US) 48328

( * ) Notice: Subject to any disclaimer, the term of this patent is extended or adjusted under 35 U.S.C. 154(b) by 0 days.

(21) Appl. No.: 09/850,449

(22) Filed: May 7, 2001

(65) Prior Publication Data

US 2002/0164562 A1 Nov. 7, 2002

(51) Int. Cl.[7] .............................................. G09B 27/08
(52) U.S. Cl. ...................... 434/131; 434/136; 84/94.1; 984/204; 446/270; 446/297; 446/409
(58) Field of Search ...................... 84/94.1, 94.2–101; 434/131–153, 284–294; 984/204; 446/297, 270, 409

(56) References Cited

U.S. PATENT DOCUMENTS

| | | | |
|---|---|---|---|
| 4,493,648 A | | 1/1985 | Suzuki |
| 4,493,649 A | | 1/1985 | Toung |
| 4,910,897 A | | 3/1990 | Hsu |
| 5,080,591 A | * | 1/1992 | Forsyth ...................... 434/147 |
| 5,269,869 A | * | 12/1993 | Peterson ...................... 156/361 |
| 5,422,429 A | | 6/1995 | Shih |
| 5,660,463 A | | 8/1997 | Ho |
| 6,174,215 B1 | | 1/2001 | Shih |
| 6,183,257 B1 | * | 2/2001 | Ho .............................. 434/131 |
| 6,204,439 B1 | | 3/2001 | Chen |

* cited by examiner

*Primary Examiner*—Derris H. Banks
*Assistant Examiner*—Dmitry Suhol

(57) ABSTRACT

Apparatus and method for rotating an object using a music box mechanism having a spring motor. Apparatus includes a mechanical motor having a spring coupled between a body and a shaft of the music box where the shaft and the body are mounted for rotation relative to each other. The spring is windable by a user to store mechanical potential energy and when released, unwindable to release the stored energy and cause relative rotation between the body and the shaft. A base adapted for stationary placement against a surface such as a table or desktop or a wall or other stationary surface is fixedly coupled to or integrally formed with the shaft of the music box motor. An object such as a spherical planetary object or globe or any other object is connected to the body and includes an aperture or hole through which the base extends to the shaft. This aperture permits the object to rotate about the shaft without interference so that the body and the object rotate about the shaft as the spring unwinds. Connection of the winding mechanism shaft to the fixed base causes the body of the music box and attached object such as the globe to rotate.

24 Claims, 2 Drawing Sheets

ROTATING EARTH GLOBE HAVING MUSIC BOX SPRING MOTOR THAT PLAYS MUSIC AND ROTATES GLOBE

FIELD OF THE INVENTION

This invention pertains generally to structures and methods of mechanical music boxes which are powered by a mechanical spring motor mechanism, and more particularly to a music box in which the music box and an object fixedly attached to the music box, such as an Earth globe, are rotated about a predetermined axis by virtue of holding the spring unwinding mechanism stationary.

BACKGROUND

The field of mechanical music box art, as in many of the mechanical arts, is fairly well developed, having derived from the clockmakers' art of earlier centuries. At the same time, however, little development has occurred to extend such arts to new technological areas or applications, or to combine such art with other elements in novel ways. Furthermore, the music box of such traditional devices is usually hidden and/or static, that is devoid of motion.

In one traditional type of music box, the music generating mechanism (such as a spring-motor driven toothed cylinder and a plurality of tuned metal reeds which vibrate when struck by the teeth) is hidden in a lower portion of a jewelry box. Lifting of the jewelry box lid releases a mechanical latch, allowing the spring motor to rotate the toothed cylinder and actuate the music playing. In such traditional music boxes, potential energy is stored in the spring by manually winding the spring with a key, as is known in the art. The music box itself remains stationary while the toothed cylinder within the box rotates. Normally, the key that is used to wind the spring motor unwinds by rotating in the opposite direction from the winding direction during music playback.

One use of the music box, and the rotating nature of the key or shaft during the unwinding, is to use the energy of the spring to supply motion to another object. For example, U.S. Pat. No. 5,422,429 accomplishes this by replacing the winding key with a longer rotating shaft and attaching an object (in this case an ornamental carousel horse) to be rotated with the shaft. A special start and stop mechanism is used in conjunction with the music box (both hidden in an drawer), having the music box play music and rotate the object when the drawer is open, and to stop playing and rotating when the drawer is closed. This however leaves the music box upside down, offering an unpleasant view. Therefore in this invention the music box is hidden and its orientation unimportant.

Other methods of using the stored potential energy in a music box for rotation of another object may require specialized music boxes that allow for attachable shafts and/or gears, increasing cost and breakability Other methods may also leave the winding key awkwardly placed, the music box being less ergonomic to use and more likely to break.

While the generic use of some types of wound spring motors and music box mechanisms has been known for some time, the fill potential of such mechanisms has not been filly appreciated, especially from an esthetic perspective. Increasingly, electronic and/or computer gadgets have supplanted elegant mechanical structures of earlier times. As a result, the contemporary home is awash with batteries, electronic beeps, tangles of power cords, and mantles and tabletops that begin to more resemble electronics workbenches than esthetic and contemplative focal points.

Therefore, there remains a need for contemporary decorative and functional objects that are animated yet electrical energy conservative. An Earth globe that rotates under its own mechanical power and optionally plays a musical tune is an example of one such decorative object.

SUMMARY

The invention provides an apparatus and method for rotating an object using a spring motor such as the spring motor in a music box mechanism. The apparatus includes a mechanical motor having a spring coupled between a body and a shaft where the shaft and the body are mounted for relative rotation. The spring is windable to store mechanical potential energy and when released, unwinds to release the stored energy and cause relative rotation between the body and the shaft. A base adapted for stationary placement against a surface such as a table or desktop is fixedly coupled to, or integrally formed with, the shaft of the motor. An object such as a spherical planetary object or globe or any other object is connected to the body and includes an aperture or hole through which the base extends to the shaft. This aperture permits the object to rotate about the shaft without interference allowing the body and the object to rotate about the shaft as the spring unwinds.

In one particular embodiment, the object is an Earth globe formed of a transparent or semitransparent material, so that the music box having a transparent housing is visible as the globe turns and the music plays.

Method for operating the mechanism to rotate and object such as the Earth globe is provided, as is an article of manufacture.

REFERENCE NUMERALS IN DRAWINGS

Figure 1:
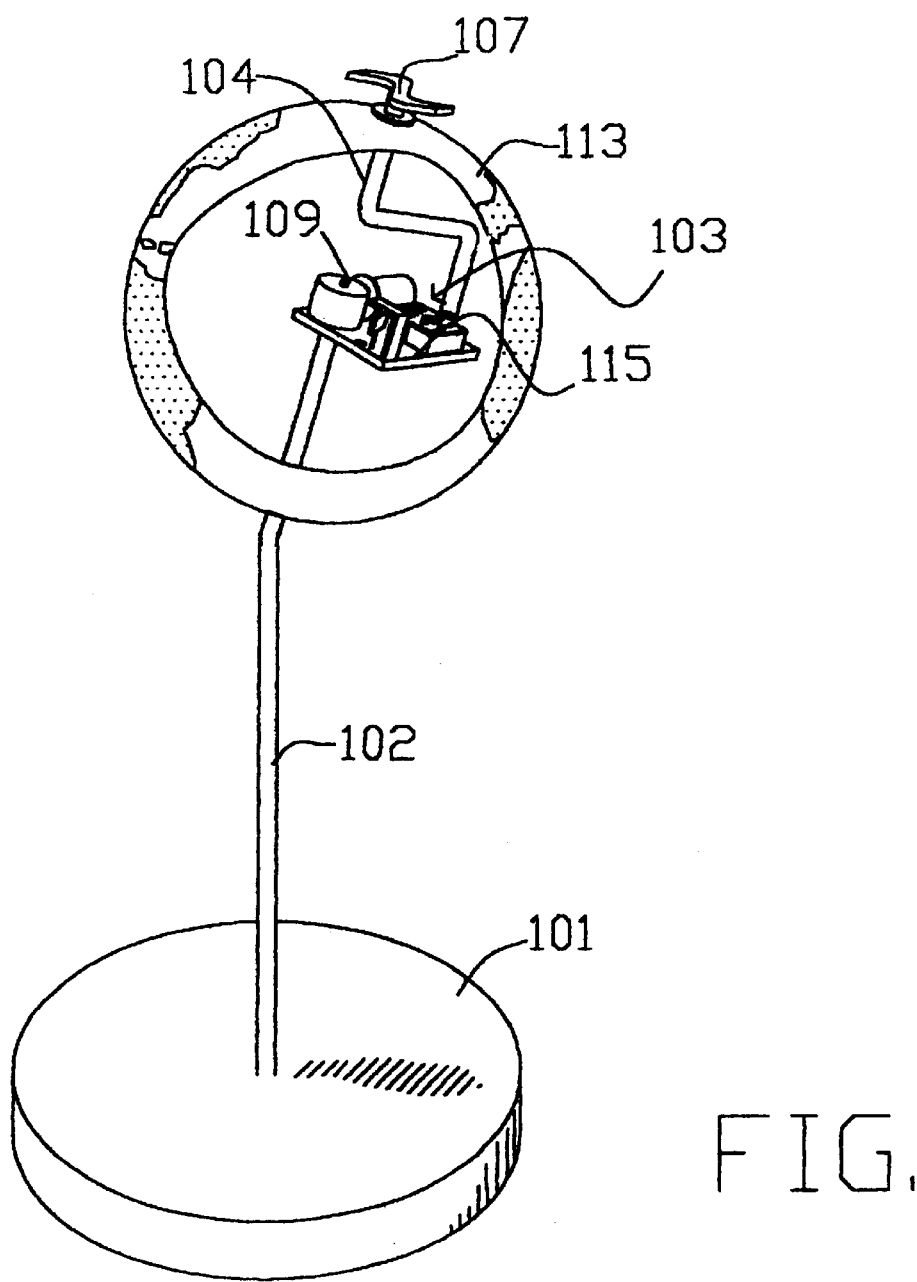
FIG. 1 is a diagrammatic illustration showing a perspective view of an embodiment of the invention with an Earth globe as the rotatable object. The Earth globe is sectioned open.

101. Base
102. Stem
103. Standard spring wound music box
104. Crank
105. Northern hemisphere of globe
106. Southern hemisphere of globe
107. Winding key
108a. Flexible washer
108b. Flexible washer
109. Winding axis/ shaft of music box
110. Standard screw hole in base of music box
111. Aperture in northern hemisphere
112. Aperture in southern hemisphere
113. Globe
114. Threaded nut
115. Outer housing of music box

DETAILED DESCRIPTION OF EMBODIMENTS

The invention provides a structure and method having many advantageous features. In one aspect, the invention uses the spring motor of a music box mechanism to provide rotation to an object such as an Earth globe in a very simple manner without the need for additional gears, transmission, complicated coupling or interface. This is realized in one embodiment by holding the standard music box winding/unwinding spring motor mechanism shaft stationary, and having instead the entire music box rotate about this shaft axis. Other embodiments hold the music box stationary and allow the winding shaft to rotate, but this is not preferred. In another aspect, the invention provides a music box which not only plays music, and functions as a needed source of rotational energy for an Earth globe, but also enhances the rotation of the globe or other decorative object by rotating with it (while housed internal to the decorative object) in an esthetically pleasing manner. In another aspect, the invention provides a music box that rotates any object such as the head of a popular cartoon character in a simple, cost effective manner requiring the addition of few extra components. Embodiments of the invention may utilize the spring motor of the music box alone without having the music box play sounds. However, in preferred embodiments, the music box incorporates a drum and vibrating reeds or strikers that play music as the spring motor unwinds. Where music or other sound is not to be played, any mechanical spring motor may be used and the invention is not limited to the specific types of spring motors used in music boxes.

According to one embodiment of the invention, a standard spring wound music box is secured to a stationary base and/or stem at the axis of the unwinding mechanism (where the standard winding key usually is secured). In a conventional music box the spring is wound and unwound through this key. While this had no disadvantages for the functioning of the conventional stationary music box, in circumstances such as the rotation of a globe around its axis (according to the present invention), holding the unwinding mechanism stationary and allowing the entire music box to rotate is a much simpler mechanism requiring fewer parts. The music box is placed with an object such as the Earth globe with the stem protruding from an aperture in the object if the object encloses the music box. Optionally, but advantageously, a means of connecting the body of the music box to the object will allow the object to wind the music box and also rotate with the music box as it unwinds and plays music. Also this has esthetic advantages. In other arrangements in which the music box is used to rotate an object, the unwinding mechanism is used in an awkward geometry, leaving in many cases the music box upside down. This is disadvantageous, particularly when the music box has been designed to show its inner workings from the normally top surface, and this surface becomes hidden or otherwise unviewable. According to this invention, the music box can face upward, which is the superior side having a view of the cylinder, keys, gears and governor. The globe or other object can be made of clear materials, cut away or otherwise made to allow the view of the external and internal workings of the music box. A further visual advantage is the extra rotational motion of the entire music box rotating about the unwinding axis.

In one aspect, the invention provides a novel combination of a spring motor driven music player (conventionally referred to as a music box) and a celestial body such as an Earth globe. Celestial bodies are particularly desirable for use in the present invention in that they naturally rotate and are best viewed and indeed contemplated in the geographic and/or cosmological sense when in motion. The Earth, the Moon, Mercury, Mars, Venus, Saturn. Jupiter and other objects of our solar system or of the universe are mere examples of the real world celestial objects that may be used. For those Star Trek™ fans, fictitious planets or worlds such as Romulus, the Klingon home world, may equally as well be used. While celestial bodies define one class of objects for use with the inventive structure and method, the invention is not limited to this class of rotatable objects. Rather, almost any object may be used. For example, model automobiles, model airplanes, cartoon character bodies and/or heads (such as the Walt Disney® character Mickey Mouse®), art sculptures, figurines, and a variety of other objects may be used.

Selected embodiments of the invention are now described relative to drawings. With reference to the drawings, FIG. 1 is a diagrammatic illustration showing a perspective view of an embodiment of the inventive structure. In operation, the inventive structure provides a stationary base 101 which allows the music box Earth globe (or other object) to be placed on or attached to a surface. Such surfaces may for example include a tabletop, dresser, counter, fireplace mantle or other horizontal surface. The base 101 may alternately provide means for mounting to a vertical or other arbitrarily angled surface, such as a vertical wall surface of angled surface on the dashboard or windshield of an automobile.

Figure 2:
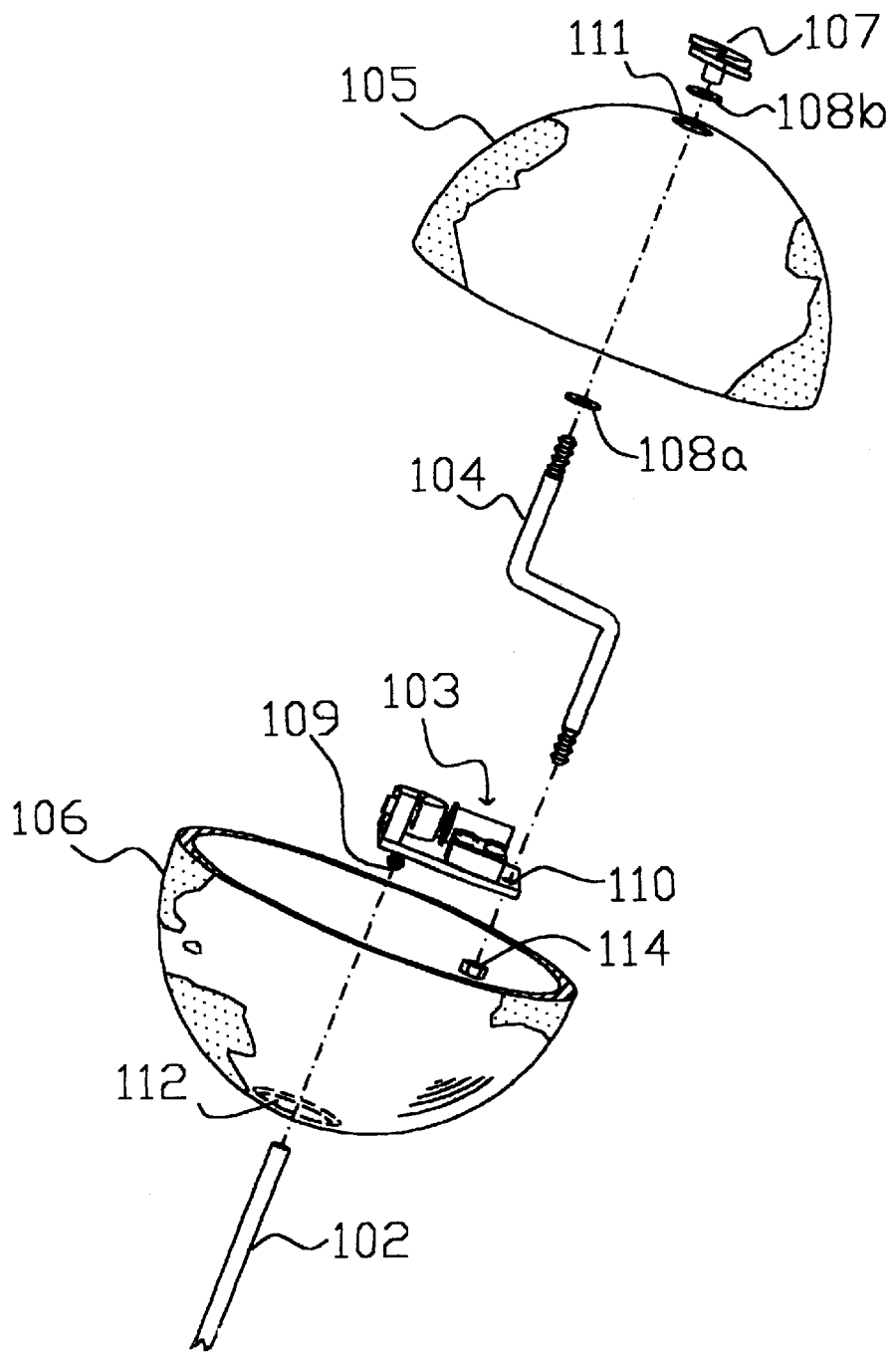
FIG. 2 is a diagrammatic illustration showing an exploded detail view of the stem to music box connection, and the music box to Earth globe connection.

Attached to stationary base 101 or formed integral therewith is a stem 102 which is itself connected to the motive spring winding (and unwinding) axis 109 of the music box 103 (a detail of this connection is shown in FIG. 2.) A portion of the object, such as an Earth globe, is fixedly connected to the outer housing portion 115 of the music box. As stem 102 is fixedly attached to a stationary base 101 and to the winding/unwinding axis 109 of the music box 103, it will be clear that outer housing portion 115 of music box 103 (as well as internal components of the music box other than the winding/unwinding shaft and portions of the spring) and any object attached to it will rotate when the music box plays This differs from traditional or standard music boxes used in a conventional manner in which the music box is stationary and the spring shaft and winding key rotate. It is also different from more contemporary devices in which the music box is stationary, but rotation of the winding/unwinding shaft rotates an object such as described in U.S. Pat. No. 5,422,429.

The manner in which the object (e.g. Earth Globe) is attached or connected to the outer housing 115 of the music box 103 may vary depending on the characteristic of the object (including for example its size, shape, symmetry or lack thereof) and the desired method of winding the music box spring motor. This attachment (though not all embodiments of the invention have an attachment that takes the form of a traditional mechanical crank) is conveniently referred to as crank 104, as this attachment ultimately provides the functional mechanical interface between the music box spring motor and the exterior surfaces of the inventive structure. Many variations and alternative methods and mechanisms are possible. Where the object is somewhat transparent, such as an Earth globe formed of a plastic, acrylic, glass or other substantially clear material on which the opaque or partially opaque continents are overlaid, the esthetics of the crank attachment 104 may be as important as the particular crank attachment structure. In the embodiment illustrated in FIG. 1 a sectioned opened Earth globe 113 is shown.

Important consideration in selecting a mechanically suitable and/or esthetically acceptable crank attachment structure may, for example, include: (i) whether it is desirable to touch and rotate the object itself or a separate handle, knob or key attached to the object; (ii) the absolute and/or relative physical location of the spring motor winding/unwinding axis and the location of the crank attachment to the outer housing portion 115 of the music box; (iii) any desire to maintain (or not maintain) the winding/unwinding shaft with the rotational axis of the object, so that the object may appear to rotate about the same axis or to have an offset and appear to orbit around the axis. This is best illustrated by way of two contrasting examples. It may be most desirable to align the winding/unwinding axis with the attachment of the crank to the North Pole of the Earth globe so that the Earth globe appears to rotate about the pole without wobbling Yet, to offset the winding/unwinding axis from the attachment of a toy airplane object so that the airplane appears to circle a stationary point in space rather than merely rotate in space; and (iv) any mechanical constraints, efficiencies, or economies that may influence the location at which the crank attachment is mounted to the exterior music box housing. These factors are merely illustrative of some factors to be considered.

As a mechanical spring motor is used to drive the music playing mechanism as well as to provide rotation of the Earth globe or other object, there is no need for an electrical power cord extending from the structure and no need for access to batteries or the like power supply. Therefore, cost of ownership including operating costs is reduced over the costs for an electrically powered globe having music playback. The size of the music box and globe or other object is also highly scalable. Structures varying from only a few inches tall to several feet high may be made, the strength and energy required to rotate a larger object being readily available from the larger and stronger spring that may be housed within the larger object.

Having described the inventive structure and method in somewhat generic terms, attention is now directed to several illustrative embodiments. With reference to FIG. 1a first embodiment, the invention provides an Earth globe music box in which features of the Earth (for example, physical features, geopolitical features, or the like) are applied to the surface (or integrally formed with the sphere) of a substantially transparent sphere. Conveniently, the sphere will be formed from a plastic or acrylic material, but may be formed of glass, crystal or other transparent or somewhat transparent material. (Recall that transparency is required only when it is desired to see the music box within the rotating object, and that embodiments of the invention need not be transparent, but rather my be translucent or opaque.) Areas of Earth corresponding to oceans and other bodies of water may be slightly tinted blue so that the internal music box remains visible, yet the Earth Globe has more of an esthetic natural appearance and coloration. An exemplary embodiment of an Earth globe music box apparatus having transparent and semitransparent regions is illustrated in FIG. 1.

This embodiment of the inventive music globe includes a stationary base 101 a stem or pedestal 102 coupling the base 101 to the winding/unwinding shaft 109 of the music box 103, and a globe 113 coupled to a music box outer housing 115 via a crank or other shaft attachment means 104. More specifically, there is illustrated an embodiment of the structure having a somewhat circular base 101 that is appropriately sized and shaped for placement on the horizontal surface such as a tabletop or mantle. The base may be formed of any material and may be any shape as long as it supports the weight and placement of the elements attached to it, including the music box and globe. In the preferred embodiment, the base 101 is made of wood with optional inlaid metal piece such as copper or brass, which may match the other hardware pieces and provide weight. Where external inlay pieces are not desired, the base may be weighted with metal, ceramic, or other relatively heavy material interior the base 101. However, the base and other hardware can be made of other materials including plastics, ceramics, composite materials and the like. In other embodiments the base is absent and instead the stem or winding axis shaft attaches to a preexisting base such as a tabletop or wall.

With reference to FIG. 1 and FIG.2, stem 102 extends from and is secured to stationary base 101(stationary base viewed in FIG. 1 only) and protrudes through an aperture 112 in the Southern Hemisphere 106 of the globe and attaches to the music box winding/unwinding shaft 109. The bottom of the stem 102 attaches to base plate 101 and is secured there by conventional fastening means, such as a threaded screw, by adhesive, by friction or press fit, and other fastening means as are known in the art.

Stem 102 may alternatively be formed integral with the base plate 101. In one instance, base plate and stem 102 are integrally formed from a reinforced plastic material and upper extremity of the stem portion 102 comprises a metal coupling for mating to or coupling with the winding/unwinding shaft of the music box. In one embodiment, this coupling may be eliminated entirely and the music box winding/unwinding shaft itself is integrally formed with the base/stem component While the embodiment depicted in FIG. 1 shows a substantially rod-like stem, it will be understood that any shape of stem that couples the music box with the any base may be used so long as it provides or couples to the spring motor winding/unwinding shaft of the music box. Desirably, the terminal portion proximate the music box will be formed of metal and be somewhat tubular or rod-like in shape so as to minimize the size of aperture 112 at the Southern Hemisphere of the globe through which the stem 102 will pass. In embodiments where the object does not completely surround the music box, this preference may be significantly relaxed.

Stem 102 can vary in length and may or may not have bends, angles, or other ornamental curves along its length. In the preferred embodiment in which the Earth globe 113 is being rotated, the stem 102 includes a portion that mounts the globe at the Earth's tilt or inclination as it orbits the sun of about 23.5 degrees. Of course, this angle need not be precise, and any angle that suggests to the viewer that the Earth's rotational axis is tilted or inclined relative to its solar orbital motion is sufficient For example, any angle between about 10 degrees and about 35 degrees would provide the desirable reality, depending somewhat upon the age, education and sophistication of the viewer.

The top of stem or pedestal 102 may include a metal portion having a threaded or tapped end which screws into the mating threads for, or other means of connection to, the winding/unwinding axis shaft 109 of music box 103. Other forms of coupling may alternately be used, such as for example, a keyed or shaped tubular collar. A collar having one or more setscrews, welding brazing, epoxy or other adhesive, molding, or other forms of attaching a shaft to another shaft or a pedestal as is known in the art. It should be noted that in some embodiments, the winding/unwinding shaft of the music box spring motor may effectively attach directly to the base so that stem 102 is either very short, or entirely absent.

Crank attachment 104 connects to music box 103. The crank attachment may take a variety of forms, the shape and geometry generally depending upon whether substantially pure rotation is desired or whether an offset orbital motion of the object is desired and the desired attachment point of the crank attachment 104 to the music box. For the Earth globe, where pure rotation along an axis extending between the north and south poles is most desirable, the point of attachment to the surface of the globe should desirably be substantially coaxial or aligned with the music box winding/unwinding shaft. Therefore, where it is possible to attach the crank attachment to the outer housing of the music box at the location and angle that the winding/unwinding shaft would extend through, the crank attachment shaft is a linear shaft that appears to extend from the stem 102 at (or near) the southern hemisphere 106, through the winding/unwinding shaft, and out the surface of the music box housing (or near) the northern hemisphere 105 of the globe.

In one embodiment of the invention, the structure is adapted to be used with the existing range of music box configurations in which mounting the crank attachment to be coincident and coaxial with the winding/unwinding shaft is difficult. In this embodiment, the crank attachment shaft includes an offset that compensates for the difference in position between the music box outer housing attachment location of the crank attachment shaft and the location of the winding/unwinding shaft. As illustrated in the embodiment of FIG. 2, the crank attachment shaft is attached at one of the available standard screw holes in the outer housing of the music box with threaded nut 114. These available screw holes may have been provided for mounting the music box to another decorative case, another item, or for some other purpose. In some instances, rather than using available holes for attachment, it will still be necessary to provide a hole at an attachment location, but an offset will be required as the physical configuration may preclude attachment directly at the location of the winding/unwinding shaft.

The top of crank 104, whether having an offset or no offset, protrudes through aperture 111 in the northern hemisphere 105 of the globe. In one embodiment, the top of the crank attachment is attached to globe 113 by any available attachment means, such as by threaded fasteners, adhesive, molding, press fit, or the like methods and means as are known in the attachment and fastening arts. A standard screw hole 110 may be provided in the base of the music box 103. When the globe 113 is directly mounted in this manner, the user will typically grasp or otherwise rotate the globe while maintaining the base stationary to wind the music box spring motor. A release mechanism may be used to start and stop the music and rotation of the globe. An additional control may optionally be provided to select only globe rotation using the music box motor without playing the music, playing music without globe rotation, or both rotating and playing music. In one embodiment, this control takes the form of a clutch that decouples the separate movements and operations.

In an alternate embodiment, the top of the crank attachment shaft is threaded or otherwise shaped to mate with or match the end of a standard winding key 107. The winding key may be permanently attached, or removable so that it provides a good grip for winding, but does not detract from the esthetics of the globe. In the preferred embodiment, globe 113 is made from a clear material such as plastic, acrylic, or glass or otherwise allowing a view of the workings of the music box 103. Both sides of aperture 111 in Northern Hemisphere 105 can be fitted with flexible washers 108a and 108b or other cushioning means which will allow the winding key 107 to be tightened to crank 104 without deforming, cracking, or otherwise damaging the curved surface and/or file surface of globe 113. The cushioning material may, for example, be selected from such known materials as rubber, cork, felt, or other polymeric materials, as are known in the art. Even where mechanical cushioning to prevent damage to the sphere is not required, it may be advantageous to incorporate such cushioning materials to enhance the sound of the music, such as to prolong the musical tone and to prevent unwanted vibrations.

In an alternative embodiment, the head of a cartoon character replaces the globe. For an example, Donald Ducks™, Mickey Mouse™, or similar cartoon or animation characters. Analogous structures and operation are involved as to the afore described Earth globe or other celestial bodies. Either of there embodiments may be combined with additional rotating, orbiting, and/or stationary components. For example, the Earth globe may be combined with a stationary moon object that is attached to the stem 102 or to the base 101 of the Earth globe, or the moon may attached to music box 103 or Earth globe 113 and rotate. These additional optional objects may incorporate similar mechanisms as already described. For example, a single base 101 may support multiple rotating cartoon heads or other objects.

In still additional alternative embodiments, nested inner and outer stationary and/or moving (rotating or orbiting) objects may be provided. In one such embodiment, an inner object (of any symmetrical shape, such as an ellipse, cylinder, cone, frustum of a cone, sphere or globe) is held stationary and an outer object having rotates relative to the inner globe. (Alternatively, the inner sphere or globe rotates and the outer sphere or globe rotates.) These inner and outer objects may frequently be similarly shaped objects, such as inner and outer spheres, but need not have the same shape so long as they do not interfere with each other during rotation. Various special effects may be achieved by selecting the two or more objects appropriately. For example, in one embodiment, interference patterns are formed via the relative orientation of lines, curves, grips or other regions on one or more surfaces. In another embodiment, an outer sphere includes regions of translucency and/or opacity to simulate clouds traveling over the surface of an inner Earth globe. In yet another embodiment, multiple spheres each having a runner or racehorses rotate at different speeds simulating a race event Those workers having ordinary skill in the art will appreciate in light of the description provided here that many more applications, configurations, and objects may be implemented and that intervention is not limited to specific exemplary embodiments mentioned or described in detail.

Those workers having ordinary skill in the art in light of the description provided here will appreciate that the Earth globe music box (as well as the alternative embodiments) functions similarly to standard music boxes and has similar purposes of collection, gift-giving and ornamentation.

The operator or viewer/listener would wind the spring of the music box from the key preferably placed at the top of the globe (or other object) or by using the globe (or other object) itself as the winding mechanism, as described. The spring would then turn the cylinder as is known and standard for a music box, and also turn the music box itself since the usual place of unwinding is being held fixed by the stem 102 to the base. The globe being connected to the music box rotates with it creating sound such as music and visually pleasing motion especially if the globe is clear or otherwise allows a view of the music box motion and rotations.

Thus the scope of the invention should be determined by the appended claims and their legal equivalents, rather then by the illustrative exemplary embodiments specifically described herein. All references to patents or other publications made herein are incorporated by reference.

I claim:

1. An object rotating apparatus for placement against an external surface, said apparatus comprising:
   a mechanical motor having a spring coupled between a body and a shaft, said shaft and said body mounted for rotation relative to each other, said spring being windable to store mechanical potential energy and being unwindable to release said stored energy and cause relative rotation between said body and said shaft;
   a music generating mechanism coupled with said mechanical motor and generating a musical sound when said body and said shaft undergo relative rotation;
   a base adapted for stationary placement against said external surface and fixedly coupled to or integrally formed with said shaft; and
   an object fixedly coupled to said body and having an aperture through which said base extends to said shaft;
   said body and said object rotating about said shaft as said spring unwinds.

2. The apparatus in claim 1, wherein said shaft is held stationary allowing said body and said object attached thereto to rotate about said shaft.

3. The apparatus in claim 1, wherein said object comprises an object having a shape of a head or head and body of a Walt Disney Mickey Mouse cartoon character.

4. The apparatus in claim 1, wherein said object is selected from the set of objects consisting of a model automobile, a model airplane, and a figurine.

5. The apparatus in claim 1, wherein said object rotates and produces an optical light pattern that changes as it rotates.

6. The apparatus in claim 1, wherein said object rotates and produces an optical interference pattern formed via the relative orientation and movement of lines or curves on said object and on a different nested object that changes as it rotates.

7. The apparatus in claim 1, wherein said music generating mechanism comprises a mechanical music box.

8. The apparatus in claim 7, wherein said mechanical motor comprises a mechanical spring motor of said mechanical music box; said body comprises a portion of said music box; said object comprises an Earth globe; said shaft is held stationary allowing said body and said Earth globe attached thereto to rotate about said shaft; and said Earth globe is attached to the said music box so that said Earth object winds said spring of said music box and rotates with the music box as it unwinds and plays music.

9. The apparatus in claim 8, wherein the Earth globe is made of a transparent regions of material to allow a view of at least a portion of said music box disposed internal to said globe.

10. The apparatus in claim 1, wherein said external surface for which said apparatus is adopted for placement against comprises an external horizontal surface.

11. The apparatus in claim 1, wherein said external surface for which said apparatus is adopted for placement against comprises a tabletop surface.

12. A spherical object rotating apparatus for placement against an external surface, said apparatus comprising:
   a mechanical motor having a spring coupled between a body and a shaft, said shaft and said body mounted for rotation relative to each other, said spring being windable to store mechanical potential energy and being unwindable to release said stored energy and cause relative rotation between said body and said shaft;
   a base adapted for stationary placement against said external surface and fixedly coupled to or integrally formed with said shaft; and
   a spherical object fixedly coupled to said body and having an aperture through which said base extends to said shaft;
   said body and said spherical object rotating about said shaft as said spring unwinds.

13. The apparatus in claim 12, wherein said object comprises a globe of a celestial object selected from the set consisting of Earth, Moon, Mercury, Mars, Venus, Saturn, Jupiter, other objects of our solar system, Star Trek™ fictitious Romulus planet, and Star Trek™ fictitious Klingon planet.

14. The apparatus in claim 13, wherein said globe of a celestial object comprises an Earth globe.

15. An object rotating apparatus for placement against an external surface, said apparatus comprising:
   a mechanical motor having a spring coupled between a body and a shaft said shaft and said body mounted for rotation relative to each other, said spring being windable to store mechanical potential energy and being unwindable to release said stored energy and cause relative rotation between said body and said shaft;
   a mechanical music box wherein said mechanical motor comprises a mechanical spring motor of said mechanical music box;
   a base adapted for stationary placement against said external surface and fixedly coupled to or integrally formed with said shaft; and
   an object fixedly coupled to said body and having an aperture through which said base extends to said shaft;
   said body and said object rotating about said shaft as said spring unwinds.

16. The apparatus in claim 15, wherein a stem is fitted to said music box instead of a winding key, the stem being held in an approximately vertical orientation by attachment to said base.

17. The apparatus in claim 15 wherein said object is attached to the said music box so that said object winds said spring of said music box and rotates with the music box as it unwinds and plays music.

18. The apparatus in claim 15, wherein the object is made of a transparent regions of material to allow a view of at least a portion of said music box.

19. A musical rotating Earth globe comprising:
   a mechanical spring motor driven music box having a coiled spring coupled between a music box body and a music box winding shaft rotatable relative to said music box body, said shaft and said body mounted for rotation relative to each other,
   a base coupled with said winding shaft and not allowing the said winding shaft or the winding mechanism coupled thereto to rotate; and
   an Earth globe fixedly coupled to and substantially surrounding said music box body, said Earth globe rotating about said shaft and said music box generating music as said spring of said spring motor unwinds.

20. The apparatus in claim 19, wherein said Earth globe is attached to the said music box so that said Earth globe winds said spring of said music box motor when rotated in a first direction and rotates with the music box as it unwinds in a second direction opposite from the said first direction and plays music as it unwinds.

21. A musical rotating object comprising:
- a mechanical motor driven music box having a coiled spring between a music box body and a music box winding shaft rotatable relative to said music box body, said shaft and said body mounted for rotation relative to each other;
- a base coupled with said winding shaft and not allowing the said winding shaft or the winding mechanism coupled thereto to rotate; and
- an object fixedly coupled to and substantially surrounding said music box body, said object rotating about said shaft and said music box generating musical sound as said spring of said spring motor unwinds.

22. The apparatus in claim 21, wherein said object is attached to the said music box so that said object winds said spring of said music box motor when rotated in a first direction and rotates with the music box as it unwinds in a second direction opposite from the said first direction and plays music as it unwinds.

23. The apparatus in claim 22, wherein said object comprises an object selected from the set of objects consisting of an object having a shape of a head of a Walt Disney Mickey Mouse cartoon character, an object having a shape of a head and body of a Walt Disney Mickey Mouse cartoon character, a model automobile, a model airplane, a figurine, a globe of Earth, a globe of Moon, a globe of Mercury, a globe of Mars, a globe of Venus, a globe of Saturn, and a globe of Jupiter.

24. A spherical object rotating apparatus comprising:
- a mechanical motor having a spring coupled between a body and a shaft, said shaft and said body mounted for rotation relative to each other, said spring being windable to store mechanical potential energy and being unwindable to release said stored energy and cause relative rotation between said body and said shaft;
- a base adapted for stationary placement against an external surface and fixedly coupled to or integrally formed with said shaft; and
- a spherical object fixedly coupled to said body and having an aperture through which said base extends to said shaft;
- said body and said spherical object rotating about said shaft as said spring unwinds.

* * * * *